Jan. 5, 1971  W. EYBERG ET AL  3,551,945
APPARATUS FOR PRODUCING HOT AND COLD INSULATING SHEET
Original Filed Oct. 18, 1967  3 Sheets-Sheet 1

Inventors:
Willy Eyberg
Josef Fülber
Helmut Habig
BY Spencer & Kaye
Attorneys

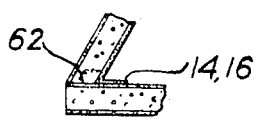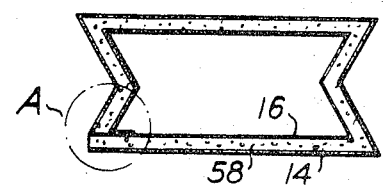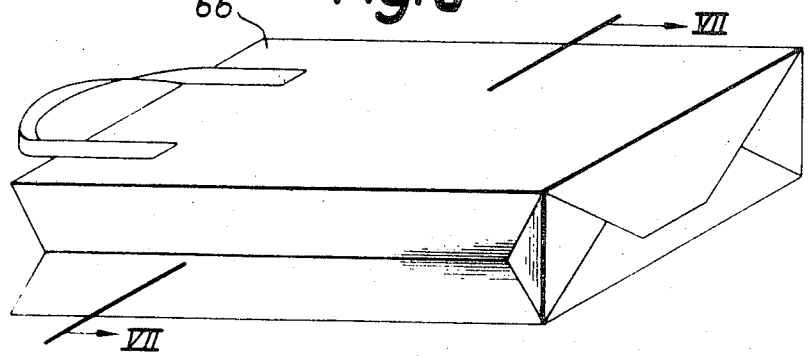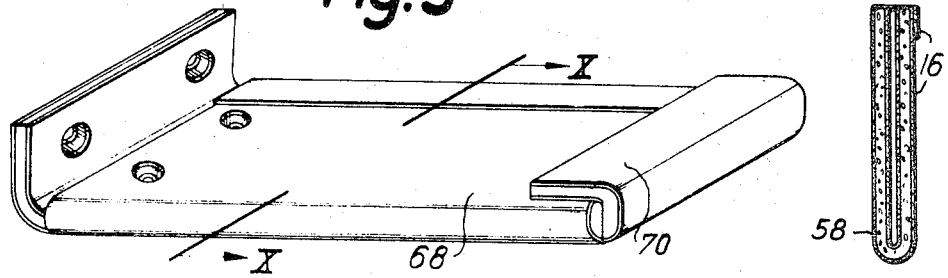

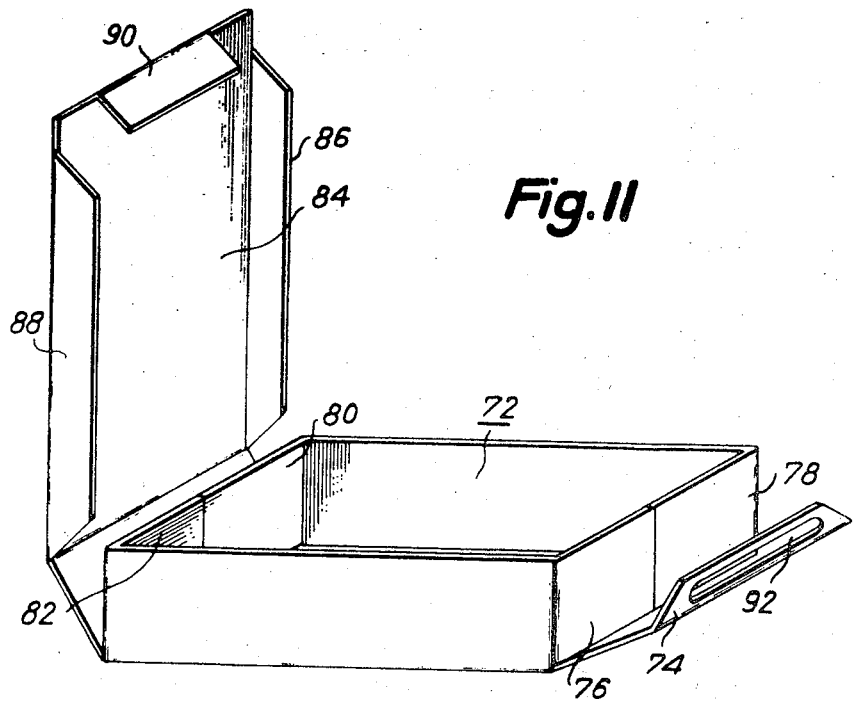
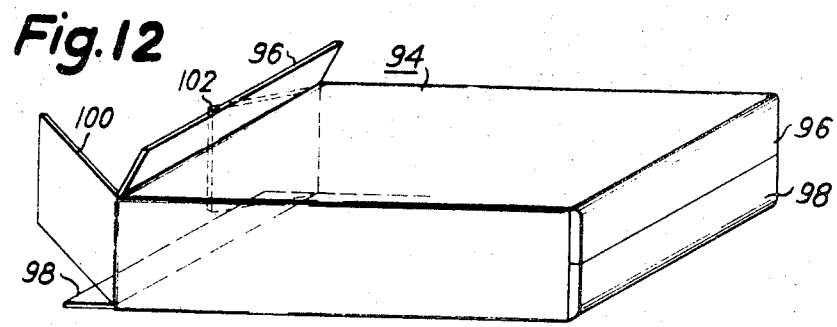
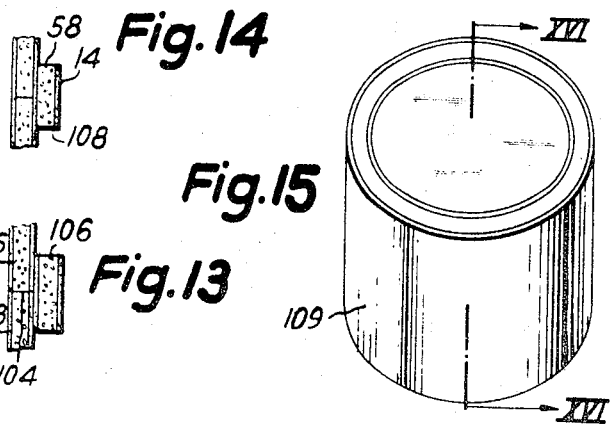

United States Patent Office 3,551,945
Patented Jan. 5, 1971

3,551,945
APPARATUS FOR PRODUCING HOT AND COLD INSULATING SHEET
Willy Eyberg and Josef Fülber, Osnabruck, and Helmut Habig, Brackwede, Germany, assignors to Papierfabrik GmbH, Osnabruck, Germany
Original application Oct. 18, 1967, Ser. No. 676,191. Divided and this application Dec. 9, 1968, Ser. No. 800,018
Int. Cl. B26d 7/14
U.S. Cl. 18—4
11 Claims

ABSTRACT OF THE DISCLOSURE

Apparatus for producing hot and cold insulating sheet consisting, at least in part, of foamed plastic. At least two basic constitutents of a plastic are mixed with at least one activating agent and directed into a gap formed by at least two spaced apart surfaces. The mixture forms a sheet of foamed plastic, the thickness of which is determined by the size of the gap. The gap surfaces may be formed of sheets of flexible foil moved over guides or rollers and may be made of material to which the foamed plastic will adhere. The resulting insulating sheet may thus have one or more layers of this foil as a protective coating over the foamed plastic. The insulating sheet produced according to the present invention can be made thin and flexible if desired, and may be used in the manufacture of products, such as containers of all kinds, which find need for its hot and cold insulating as well as shock energy absorbing qualities.

REFERENCE TO RELATED APPLICATION

This application is a division of copending application Ser. No. 676,191 filed Oct. 18, 1967.

BACKGROUND OF THE INVENTION

The present invention relates to apparatus for producing a hot and cold insulating, as well as shock absorbing sheet, made at least in part of foamed plastic. The foamed plastic may be covered with one or more protective layers of an adhering foil of unfoamed material and/or reinforced with fibers or fabric imbedded in the foam.

Foamed plastic sheets covered with at least one protective layer of plastic foil are known in the art. Also known is the technique of inserting and foaming plastic between two walls, such as the inner and outer walls of a container. This technique has been used, for example, in the construction of buildings and manufacture of refrigerators.

It is common, for instance, to use, for the purposes just described, completely synthetic foamed plastics having a polyurethane base. Through choice of a suitable polyisocyanate on one hand and polyhydroxy compounds having a polyester or polyether base with varying degrees of branching and an increasing number of functional groups on the other, such foamed plastics may be produced by polyaddition as a material having characteristics anywhere in the range from soft-elastic through half-hard to hard.

A horizontal continuous production-line process for the manufacture of composite sheet material is already known in the art. This sheet material which has been of the type not capable of withstanding to great a stress, has been employed, for example, as building facade paneling plates, non-weight supporting partitions, roofing plates, wall boards, etc. In the horizontal process, which is most efficiently employed when the sheet material is not made to order, but is cut to an arbitrary length, foils or cover layers of metal, plastic, tar paper, etc. are introduced into a double conveyor-belt system. A spray head, which moves back and forth transverse to the conveyor direction, coats the lower cover layer with a quick-reacting mixture that forms a foaming surface. The upper cover layer is then rolled onto the mixture, and, when the mixture is dry, the laminate is cut into large plates. Sheet material having low weight per volume can be manufactured in this fashion at a high rate of production with thicknesses down to 20 mm. Difficulties arise, in practice, when thinner material is to be manufactured, however. In this case, it is neither possible to attain the high rate nor the economy of production.

SUMMARY OF THE INVENTION

An object of the present invention, therefore, is to provide apparatus for economicaly manufacturing a thin composite sheet product which may consist, for example, of an upper and lower protective foil and a foam layer sandwiched therebetween.

These and other objects which will become apparent in the discussion that follows are achieved, according to the present invention, by an apparatus for continually mixing at least two basic constituents of a plastic with at least one activating agent, and directing this mixture into a gap formed by at least two surfaces. The resulting hot and cold insulating sheet of foamed plastic will thus have a thickness determined by the size of the gap which is preferably continuously adjustable by means of two rollers, friction strips, wipers, etc. which press the surfaces together. This gap adjustment is most easily accomplished by holding one of the rollers, wipers, etc. fixed and making the other one adjustable with respect to it.

It is possible, according to the method and apparatus of the present invention, to adjust the gap such as to obtain a thickness of the insulating sheet, as small as .8 millimeter.

The surfaces which form the gap are preferably in continuous motion. They may consist of suitable protective foil material for the foamed plastic such as paper, paperboard, fabric (e.g. textiles, fleece), plastic foil, wooden foil, metal foil, etc.

The apparatus for directing the mixture of the reagents and activating agents into the gap preferably comprises one or more jets or nozzles. To improve the distribution of the reactive mixture over the entire length of the gap it may be advantageous to move a jet back and forth parallel to the gap. If a wide sheet of composite material is desired, and the gap, therefore is made quite broad, it may be necessary to employ a number of jets and move several parallel to the gap as just described.

The reactive agents which form the foamed plastic can be either injected or sprayed into the gap. The reactive agents employed with the present invention may, for example, consist of polyisocyanate on one hand and polyhydroxy compounds having a polyester or polyether base on the other. The activating agents employed in the present invention may, for example, be mixtures of agents such as tertiary amine, organic tin compounds, etc. with water and other auxiliary media such as stabilizers and dispersing group.

The particular apparatus according to the present invention for manufacturing the composite sheet material preferably comprises two sheets of foil material guided between two rollers, friction strips, wipers, etc., which are spaced a given adjustable distance apart. These two sheets form the lower and the upper surface of a gap, when they pass over the rollers, friction strips, wipers, etc. The reagents and the activating agent or agents are then directed into this air gap by means of one or more jets arranged opposite thereto. To insure an even distribution of the reagents and the activating agent or agents, the jet or jets may be guided back and forth in a direction transverse to the direction of movement of the upper and lower gap surfaces. This may best be accomplished in practice by moving the jet supports on rails arranged parallel to the gap.

In order to ensure that the foam which has formed completely reacts—reaches its final solidified state—before leaving the apparatus, the gap surfaces are moved, by means of a conveyor mechanism, between a series of pairs of temperature controllable plates, the plates in each pair of which are spaced a calibrated distance apart. The number and the temperature of these pairs of plates are so chosen that the foamed plastic completely solidifies before emerging from the series. The thickness of the hot and cold insulating foamed plastic sheet material is thus adjusted not only by changing the relative distance between the rollers, friction strips, wipers, etc., as described above, but also by changing the distance between the pairs of calibration plates.

By employing a non-adhesive layer on one of the gap surfaces, such as, preferably, a coating having a silicone base, the foamed plastic sheet may be produced with one side only lined with protective foil. By coating both the gap surfaces with a non-adhesive layer it is possible to continuously produce the foamed plastic sheet with no protective foil at all. In the latter case it may be necessary to reinforce the foamed plastic with a filler. As a practical matter the gap surface or surfaces that are provided with a non-adhesive coating may be arranged as an endless belt or as endless belts which recirculate within the apparatus.

The foamed plastic sheet material, manufactured by the apparatus of the present invention with or without the protective foil, lends itself to use as a raw material in a wide range of products. The sheet may be used, for example, to make carrying bags, crates, cases, cartons, folding boxes, boxes with separate lids, sacks, pots, jars, cans, mailing tubes, mailing envelopes; indeed, all types of containers for carrying or storing produce, commodities or products which are sensitive either to high or low temperatures or to temperature changes.

The foamed plastic sheet material according to the present invention is also well suited as an insulating cover, lining, partition, etc.

When the foamed plastic material is used in the manufacture of containers it is necessary that it be both bent and joined at various points. These points, according to another feature of the present invention, are preferably covered with an additional strip of the foamed plastic sheet, which may, for example, be constructed as ordinary adhesive tape. It is also possible to provide the container sheet joints with an additional reactive mixture thus forming a foamed plastic coating which seals and insulates the interior of the container and serves to hold these joints together. The points where the container is bent and the foamed plastic sheet is pinched together can also be coated with an additional foamed plastic layer to reinforce the insulation.

Because of its resilient properties the composite foamed plastic sheet material according to the present invention is not only suited for hot and cold insulation but can also be advantageously used to absorb shock energy. Containers manufactured of this material are consequently also useful for carrying shock-sensitive articles.

BRIEF DESCRIPTION OF THE DRAWINGS

FIG. 6 is a perspective view of a carrying bag made of foamed plastic sheet of the type shown in FIG. 3.

FIG. 7 is a cross-sectional view taken on section VII—VII of the carrying bag of FIG. 6.

FIG. 8 is a detailed cross-sectional view of the sheet joint shown within the circle A of FIG. 7.

FIG. 9 is a perspective view of a mailing envelope made of foamed plastic sheet of the type shown in FIG. 3.

FIG. 10 is a cross-sectional view taken in section X—X of the envelope of FIG. 9.

FIG. 11 is a perspective view of one embodiment of a box made of foamed plastic sheet of the type shown in FIG. 3.

FIG. 12 is a perspective view of another embodiment of a box made of foamed plastic sheet of the type shown in FIG. 3.

FIG. 13 is a cross-sectional view of a butt joint in the box of FIG. 12 having an additional strip of foamed plastic sheet of the type shown in FIG. 3 fixed to the joined flaps with adhesive.

FIG. 14 is a cross-sectional view of a butt joint of two foamed plastic sheets of the type shown in FIG. 3, having a strip of foamed plastic sheet of the type shown in FIG. 5, fixed to the joined sheets with adhesive.

FIG. 15 is a perspective view of a cylindrical container made of foamed plastic sheet of the type shown in FIG. 3.

FIG. 16 is a cross-sectional view taken on section XVI—XVI of the container of FIG. 15.

DESCRIPTION OF THE PREFERRED EMBODIMENTS

Figure 1:
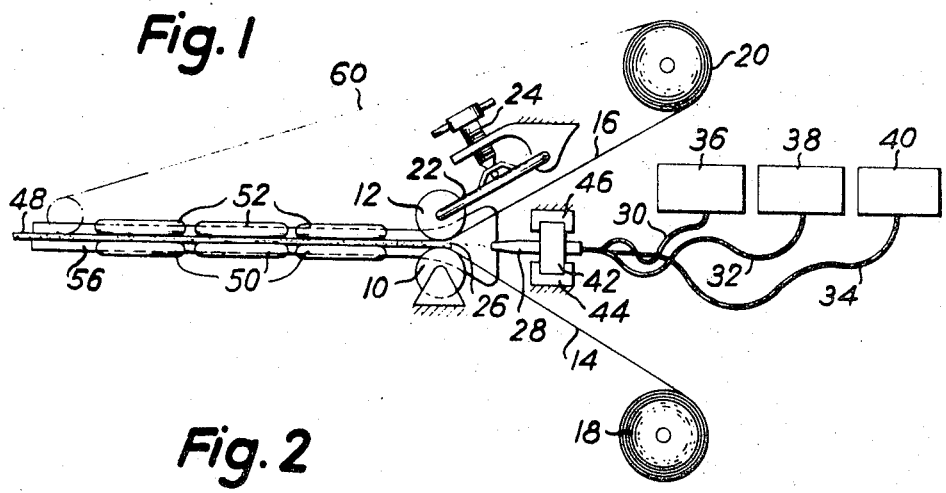
FIG. 1 is a schematic diagram, in side view, of an embodiment of the apparatus, according to the present invention, for continuously producing hot and cold insulating foamed plastic sheet material.
Figure 2:
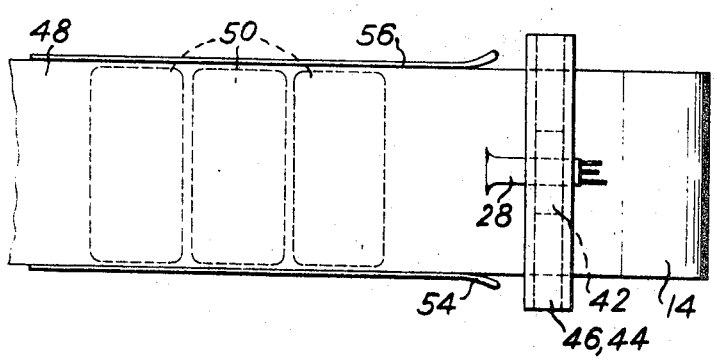
FIG. 2 is a schematic diagram, in top view, of a portion of the apparatus of FIG. 1.

Turning now to the drawings, FIGS. 1 and 2 illustrate, in schematic form, the apparatus according to the present invention for manufacturing a foamed plastic sheet. This apparatus is provided with two rollers 10 and 12 which are driven by suitable machinery, preferably in synchronization with the spools 18 and 20 from which the lower gap surface foil 14 and the upper gap surface foil 16 are unwound, respectively. The roller 12 is mounted on a support arm 22 that can be adjusted in height by a screw device 24. The size of the gap 26 between the two rollers 10 and 12 formed by the two foils can thus be controlled. A jet or nozzle 28 directed toward the gap 26 either injects or sprays, in the embodiment shown, a mixture of two reagents and one activating agent. If the jet 28 is to spray the mixture, it is preferable to reduce the relative distance between the jet and the gap 26 from that distance which is shown in the drawing. The jet 28 is fed with the reagents and the activating agent through flexible hoses 30, 32 and 34 from supply containers 36, 38 and 40 by means of suitable pumps (not shown).

In practice, the amount of the mixture of the reagents and the activating agent is adjusted to suit the capacity of the gap 26. Even distribution of the mixture over the entire width of the gap can be achieved by mounting the jet 28 on a support 42 which may be mechanically traversed back and forth on guide rails 44 and 46 by a suitable mechanism (not shown).

In order to insure the desired thickness of the multilayer or composite sheet 48, which is comprised of the protective foil 14, the foamed plastic layer and the protective foil 16, the apparatus is provided with upper and lower calibration plates 52 and 50, respectively, which hold the sheet together until the foamed plastic has solidified. To this end, the pairs of plates 50 and 52 which immediately follow the gap 26 may, for example, be heated and the subsequent and last pair cooled.

Guide plates 54 and 56, which prevent the foamed plastic from emerging from the sides of the multi-layer or composite sheet are arranged on both sides of the apparatus as shown in FIG. 2. If necessary, further leakage of the reactive fluid can be prevented by streams of air directed by jets arranged near the gap 26.

Figure 3:
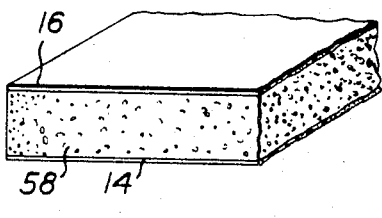
FIG. 3 is a perspective view of a section of one embodiment of the foamed plastic sheet, produced by the apparatus of the present invention, having two adhesive layers covering the foamed plastic.

FIG. 3 shows a section of the composite sheet manufactured by the apparatus of the present invention. Between the lower protective foil 14 and the upper protective foil 16 is sandwiched the foamed plastic 58. This plastic normally adheres to both foils 14 and 16.

Figure 4:
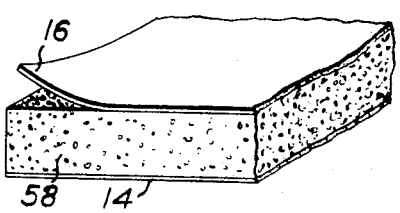
FIG. 4 is a perspective view of a section of another embodiment of the foamed plastic sheet, produced by the apparatus of the present invention having one adhesive and one removable layer covering the foamed plastic.

It is also possible to add a non-adhesive coating of a silicone base, for example, to the cover foil 16. A composite sheet with such a coating is shown in FIG. 4. The foamed plastic layer 58 is here also sandwiched between the lower foil 14 and the upper foil 16. As is seen in this figure, however, the foil 16 can be removed to leave a composite sheet consisting only of the lower foil 14 and the foamed plastic 58.

It is also possible to manufauture the composite sheet without the upper foil 16 at all. In this case, the apparatus illustrated in FIG. 1 must be slightly modified to include the equipment shown in the dotted-dashed lines. An endless recirculating belt 60 provides the cover foil 16 during the portion of the process in which foamed plastic is produced and hardened. After the composite sheet 48 has passed the series of calibrating plates 50 and 52, the belt 60 is lifted off the foamed plastic layer 58 by a roller and recirculated.

Figure 5:
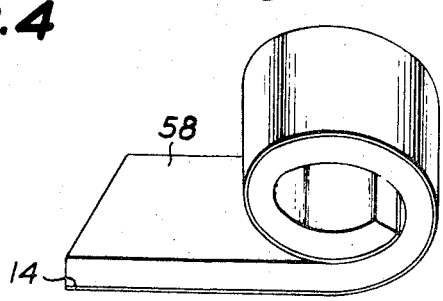
FIG. 5 is a perspective view of a section of foamed plastic sheet of the type shown in FIG. 4 with the removable layer removed.

A composite sheet 48, manufactured as just described, is illustrated in FIG. 5. The protective foil 14 and the foamed plastic 58 may be made so flexible, in this case, that the sheet can be wound into a roll.

It is also possible to replace the protective foil 14 with an endless non-adhesive recirculating belt, so that the final product consists only of foamed plastic.

If necessary, the foamed plastic may also be reinforced with filler which is introduced into the gap along with the reactive mixture. This filler might be either a fabric or fibers, for example, processed from a material such as metal, plastic, organic or inorganic compounds. An increase in mechanical strength of the foamed plastic by use of the filler may be especially useful when both the foils 14 and 16 are removed.

The hot and cold insulating foamed plastic sheet material, manufactured as described above, has many uses. It may be employed as a paper or cardboard-like raw material, for instance, in the construction of containers that are suitable for carrying or storing temperature or shock sensitive articles. Several embodiments of such containers will now be described with reference to FIGS. 6 to 16 of the drawings.

FIG. 6 shows a carrying case or bag 66 which is made of the hot and cold insulating composite sheet material of the present invention. The bag is constructed in a manner similar to a paper bag. As the cross section of FIG. 7, which is taken on the line VII–VII of FIG. 6, illustrates, the foamed plastic 58 is in this case sandwiched between two protective foils 14 and 16 in the manner of FIG. 3. In order to obtain good heat insulation at the place where the material is joined, the face surface of one side of the sheet abuts the end corner of the opposite side of the sheet. This joint is designated with the numeral 62 and shown in detail in FIG. 8.

The sheet joint is preferably glued and, to increase the strength, part of the foil 14 and 16 is joined with the inner or, if necessary, outer foil of the opposite side of the sheet. The composite sheet can, indeed, be manufactured so that the protective foil extends beyond the foamed plastic at the sheet edges. Thus, whenever an overlap is necessary to secure a joint, such as in the butt joint just described, the overlapping portion may be limited to the protective foil alone to avoid bulging.

FIG. 9 shows a mailing container or envelope made of the heat-insulating material of the present invention. In this instanue the material is used primarily for its shock-absorbing qualities.

The envelope 68 consists of a single sheet of the composite sheet material. The joining sections, such as the end piece 70, are glued to the covering sheet after bending. It also is possible to eliminate a portion of the foamed plastic 58 so that the protective foil, for example the foil 16, can be directly joined or glued to itself as shown in FIG. 10.

Another type of container which can be manufactured with the composite material of the present invention is the folding box shown in FIG. 11. This folding box 72 consists preferably of a single piece of material. The box is created with the aid of projecting members 74, 76, 78, 80, 82 and 84 in the manner common in the art. The additional overlapping members 86 and 88 insure that the interior of the container is well insulated. A projection 90 is designed to be inserted in an opening 92 in the projection 74 to lock the top.

A similar embodiment of a folding box is shown in FIG. 12. The box 94 is provided with foldable projections 96, 98, 100 and 102. As may be seen at the right end of the box in FIG. 12, the following projections 96 and 98 do not overlap but directly abut, end to end. This joint area 104 can be covered with an additional strip of composite material 106 as shown in FIG. 13, to insure satisfactory insulation. This strip 106 is preferably attached with adhesive and may, in fact, be designed as a strip of adhesive tape.

Instead of employing a sealing strip 106 having two protective foils on either side as shown in FIG. 13, it is possible to use a strip of material consisting of the foamed plastic 58 and only one foil 14. Such a simple strip 108 is shown in FIG. 14. This arrangement saves cost and space, yet still provides the inside of the box with satisfactory insulation against the outside atmosphere.

Still another form of container according to the present invention is shown in FIGS. 15 and 16. This container includes a cylindrical wall 109 made of a section of the composite sheet material of the present invention. The ends of the container are closed by two circular walls 110, which, as may be seen in the cross section shown in the FIG. 16, that is taken on the line XVI—XVI of FIG. 15, are arranged inside the cylinder 109. The joints between the three walls are preferably made with an adhesive and, to insure good insulation, may also be covered with an additional piece of composite material of the present invention in the manner shown in FIGS. 13 or 14.

The manufacturing apparatus according to the present invention is not limited in use either to any particular reagents or foamed plastics. The materials set forth in this specification are exemplary only. It is possible, in fact, to employ any suitable foamed plastic or foaming material whether it be a thermoplastic or a duroplastic.

The material produced by the apparatus described herein also has many uses beyond the containers specifically illustrated and described; it is suitable, for example, for any type of sacks, boxes, cartons or bags. In its manufactured or raw form it may be used for packing bottles, porcelain, lightbulbs and other shock-sensitive articles and products, as well as lining and/or covering containers to achieve hot and cold insulation and/or shock energy absorption.

It will be understood that the above description of the present invention is susceptible to various modifications, changes, and adaptations.

What is claimed is:

1. Apparatus for producing hot and cold insulating sheet, comprising, in combination:
   (a) means forming two surfaces which form a gap of fixed predetermined size between themselves;
   (b) means for continually mixing at least two basic constituents of a foamed plastic with at least one activating agent; and (c) means connected to said mixing means and arranged in the region of said gap for directing said constituents of a foamed plastic and said activating agent into said gap, thereby forming a sheet of foamed plastic the thickness of which is determined by said fixed gap size.

2. The apparatus defined in claim 1, wherein said means forming said gap comprises two surface elements and means for moving said two surface elements and for maintaining the same a given distance apart.

3. The apparatus defined in claim 2, wherein said means for maintaining said surface elements said given distance apart includes adjustment means for adjusting said given distance.

4. The apparatus defined in claim 1, wherein said means for maintaining said surface elements said given distance apart includes guide means, in contact with each of said surface element for pressing the same toward each other.

5. The apparatus defined in claim 4 wherein at least one of said surface elements is a travelling sheet and said guide means comprise rollers over which said sheet moves.

6. The apparatus defined in claim 2 wherein at least one of said surface elements is a travelling sheet and said guide means are a means over which said one surface element slides.

7. The apparatus defined in claim 1, wherein said means (c) include a jet and means for moving said jet back and forth in a direction parallel to said gap.

8. The apparatus defined in claim 2, further comprising at least two temperature variable plate means arranged next to the sheet formed by said foamed plastic and said two surfaces after said strip has been moved out of said gap, said plate means forming means for controlling the temperature of said sheet.

9. The apparatus defined in claim 1, wherein at least one of said two surface elements is coated with a non-adhesive layer.

10. The apparatus defined in claim 9, wherein said layer has a silicone base.

11. The apparatus defined in claim 9 wherein said coated surface element is an endless belt and said apparatus further comprises belt recirculating means for moving said surface element into said gap, out of said gap and into said gap again.

References Cited
UNITED STATES PATENTS

| | | | |
|---|---|---|---|
| 2,441,235 | 5/1948 | Blair et al. | 18—4 |
| 2,816,741 | 12/1957 | Shuffman | 18—4X |
| 2,817,875 | 12/1957 | Harris et al. | 18—4 |
| 3,065,500 | 11/1962 | Berner | 18—4 |
| 3,269,882 | 8/1966 | Willy | 18—4X |
| 3,383,441 | 5/1968 | Norrnede et al. | 18—4X |
| 3,435,102 | 3/1969 | Sullhofer | 18—4X |

WILLIAM S. LAWSON, Primary Examiner